United States Patent [19]

Overhults et al.

[11] 3,839,065
[45] Oct. 1, 1974

[54] ADHESIVE CEMENT

[75] Inventors: Wendell C. Overhults, Highland Park; Richard McCrea Potts, East Brunswick, both of N.J.

[73] Assignee: Johnson & Johnson, New Brunswick, N.J.

[22] Filed: Apr. 8, 1968

[21] Appl. No.: 719,662

[52] U.S. Cl............ 106/308 N, 106/35, 106/288 B, 106/308 Q, 252/430, 252/431 N, 260/30.6, 260/37 N, 260/85.5
[51] Int. Cl......... C09c 3/00, C09c 1/28, C09c 1/40
[58] Field of Search............... 260/30.6, 85.5, 37 N; 106/308 N, 308 Q, 288 B, 308 O; 252/430, 431 N

[56] References Cited
UNITED STATES PATENTS

| | | | |
|---|---|---|---|
| 2,519,622 | 8/1950 | Archibald et al. | 252/430 |
| 2,578,605 | 12/1951 | Sears | 106/288 B X |
| 2,668,151 | 2/1954 | Pedlow, Jr. et al. | 106/308 Q |
| 2,784,127 | 3/1957 | Jaiper et al. | 154/43 |
| 2,833,753 | 4/1958 | Lal | 260/89.5 |
| 3,256,236 | 6/1966 | Herman et al. | 260/41 |
| 3,260,637 | 7/1966 | Von Bramer | 156/314 |

OTHER PUBLICATIONS

Chemical Abstracts, Vol. 53, 13773f (1959).
Chemical Abstracts, Vol. 58, 13172c (1963).
Nicolau et al., J. Chim. Phys. Vol. 61 (6) pp. 819–825 (1964).
Selane Coupling Agents, Samuel Sterman, Reinforced Plastics Symposium Vol. 58, No. 3, March 1966, p. 33–37.
Molecular Sieves, R. J. Neddenriep, Adhesive Age, June 1966.

*Primary Examiner*—H. Sneed

[57] ABSTRACT

Adhesive cements, which on curing will adhere to dry as well as wet surfaces, are prepared by mixing a monomeric ester of $\alpha$-cyanoacrylic acid with a finely divided filler containing an amine activator. The preferred activators are the tertiary amines N,N-dimethyl-p-toluidine and N,N-dimethylaniline as time delayed but rapid setting is obtained through their use. With fillers such as finely divided quartz and alumina the effectiveness of the activator is substantially reduced on standing. To obtain a stable activated filler the filler is treated with a non-catalytic trialkoxysilyl compound prior to treatment with the amine activator. The non-catalytic trialkoxysilyl compound has a terminal group represented by the formula

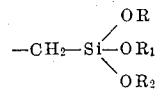

where any one of R, $R_1$, and $R_2$ may be —$CH_3$ or —$CH_2CH_3$.

The adhesive cements are particularly useful under moist or wet conditions because of their resistance to deterioration under such conditions and their ability to adhere to moist or wet surfaces. It is possible to apply the cements to surfaces while under water and bond the same together.

Alumina is the preferred filler, appearing to possess unique properties. Alumina, as compared to other fillers, gives cements having both better adhesion and strength.

Cements, particularly those utilizing finely divided alumina as the filling together with the monomeric alkyl $\alpha$-cyanoacrylate, show good adherence to tooth structure and are useful for the treatment of teeth both for filling pits, cracks, fissures and the like in the prevention of caries and in preparing dental restorations.

4 Claims, No Drawings

ADHESIVE CEMENT

The present invention is drawn to cement compositions which, on curing, adhere tenaciously to surfaces to which they have been applied. The cement compositions adhere not only to dry surfaces but also to surfaces which have been wetted with water and, in fact, may be applied to such surfaces under water for bonding objects together.

It has heretofore been proposed to use as adhesives the monomeric esters of alpha cyanoacrylic acid having the general formula:

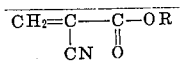

where R may be any of the terminal groups consisting of an alkyl group one to 16 carbons, a cyclohexyl group and a phenyl group. Such polymerizable monomer adhesives are described, for example, in U.S. Pat. No. 2,794,788. Although the methyl-α-cyanoacrylate has been used as an all-purpose adhesive, bonding to most surfaces and curing in a relatively short time under normal atmospheric conditions, this is not necessarily true with respect to the other monomeric α-cyanoacrylates. Thus, for example, the monomeric alkyl α-cyanoacrylates with alkyl groups of ethyl and higher are generally unsatisfactory because of the long curing time and relatively poor adherence to some surfaces. This is illustrated, for example, by monomeric isobutyl α-cyanoacrylate which adheres relatively poorly to many surfaces such as stainless steel, glass, and rubber.

It has now been discovered that cement compositions can be prepared utilizing the monomeric α-cyanoacrylates, which cements possess substantially better adherence on curing to surfaces then shown by the monomeric α-cyanoacrylates employed in making the same. These adhesive cement compositions are prepared by admixing the monomeric α-cyanoacrylate with a finely divided, activated, solid filler in amounts of about one to four parts by weight finely divided, activated filler for each part by weight of the monomeric α-cyanoacrylate used. As previously indicated, the cement compositions so formed will adhere to a wide variety of surfaces substantially more tenaciously than the monomeric α-cyanoacrylate used in their preparation and will also adhere to moist or wet surfaces, where the wetness is due to water.

The activator used is an amine catalyst. The activator cannot be added to a mix of monomeric α-cyanoacrylate and the filler as the cyanoacrylate polymerizes too rapidly when the amine activator is added to the cyanoacrylate-filler mix. Accordingly, the amine activator must first be added to the finely divided filler and the filler so treated then blended with the binder solution which comprises the monomeric α-cyanoacrylate. With fillers such as quartz and alumina, the effectiveness of the amine catalyst, after treatment of the filler, is dissipated relatively rapidly. As a result, the amine treated filler, unless blended with the monomeric α-cyanoacrylate shortly after preparation, will give varying and inconsistent setting times for the cement so obtained, with essentially no activation occurring after extended periods of storage. This is particularly true where alumina is used as the filler. When alumina is used as the filler the effectiveness of the amine activator is decreased even after standing for 1 hour, the sme becoming substantially ineffective after standing for 24 hours. With other fillers such, for example, as finely divided polyethylene, this loss of activity on the part of the amine activator does not occur.

It has been further discovered that this loss of activity on the part of the amine activator can be prevented, and stable activated fillers obtained, if the filler, prior to treatment with the amine activator, is first treated with a non-catalytic trialkoxysilyl compound having a terminal group represented by the formula

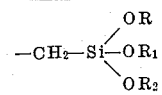

where any of R, $R_1$ or $R_2$ may be a methyl or a ethyl group. When the filler is so treated, the effectiveness of the amine activator is found to remain constant indefinitely.

Alumina, when used together with monomeric α-cyanoacrylate in preparing adhesive cement compositions, appears to act substantially differently from other fillers. Thus, not only does it show substantially more effect on the amine activator, when not pretreated, but cements prepared utilizing the alumina possess substantially greater adhesive strength than cements made from other finely divided fillers utilizing the same monomeric α-cyanoacrylate binder. Also cured cements so prepared have substantially greater compressive strength where finely divided alumina is the filler as compared, for example, with cements utilizing finely divided quartz. A further unexpected property possessed by the adhesive cements, utilizing alumina, is their tenacious adherence (to tooth structure) over long periods after application, permitting their use for the treatment of teeth in the prevention of caries by sealing pits, cracks, fissures, and the like, and their use in preparing dental restorations. The usefulness of these cements in dental applications is an important part of the present invention.

Methyl-α-cyanoacrylate has heretofore been proposed for the treatment of pits, cracks and fissures, the same being used in a mixture of one part methyl-α-cyanoacrylate to which one part of a composition comprising equal parts of silicic acid, finished silicate, silica gel, and cold curing methyl methacrylate polymer has been added. Such a composition and method of use is described in an article by Dr. Buonocore (The Journal of American Dentistry Association, July 1967, Vol. 75, pgs. 121–128). Methyl-α-cyanoacrylate, however, has the disadvantage that polymers formed therefrom tend to hydrolyze and deteriorate in the presence of moisture. Also, methyl-α-cyanoacrylate is somewhat irritating to living tissue, as are the deterioration products of polymers formed of the same.

The monomeric alkyl α-cyanoacrylates of alkyl groups above methyl are found to be substantially less irritating to living tissue than the methyl-α-cyanoacrylate. Also, when polymerized they form polymers which are substantially more resistant to deterioration in the presence of moisture than are the polymers resulting from the polymerization of methyl-α-cyanoacrylate. However, when attempts are made to use monomeric alkyl α-cyanoacrylate monomers of larger alkyl groups in place of the methyl-α-cyanoacrylate in the system described in the Buonocore article, difficulty is encountered in obtaining polymerization. Thus, for example, when isobutyl α-cyanoacrylate is used in place of the methyl-α-cyanoacrylate in the system described in the Buonocore article, polymerization cannot be obtained in less than about an hour. This is too long for dental application. However, through the practice of the present invention, particularly where utilizing alumina as the filler, not only can cements be prepared which have the necessary tooth adherence and strength for effective treatment, but the same are prepared from monomers free of the problems inherent in the methyl-α-cyanoacrylate.

In preparing the adhesive cements the pretreated filler containing the amine activator is blended with the monomeric α-cyanoacrylate binder in amounts of about one part binder to one to four parts filler. The admixed amine activated filler and binder form a fluid paste which is then applied to the surfaces to be bonded. The time of setting after mixing of the filler and monomeric binder solution is controlled by the amount of amine activator on the binder. With most amine activators shortly after admixing the monomeric α-cyanoacrylate with the pretreated filler, the composition so formed tends to slowly increase in viscosity until the same has finally set into a hard cementitious mass. With the amine activators N,N-dimethyl-para-toluidine and N,N-dimethylaniline, the mix of pretreated filler and monomeric αcyanoacrylate maintain its initial fluidity until just prior to its setting time at which a rapid set occurs into a hard cementitious mass.

The adhesive cements, on mixing the amine activated filler and monomeric α-cyanoacrylate, have a relatively thin fluid consistency and will wet most surfaces to which they are applied, adhering strongly to these surfaces on polymerization of the monomeric α-cyanoacrylate binder. Although the adhesive cements are not tacky in the normal sense, it is found that on setting they have adhered strongly to the surfaces to which they have been applied. As previously indicated, the setting time can be varied from a fraction of a minute to as long as is desired by proper treatment of the filler.

As a filler, any finely divided solid may be utilized that is substantially inert with respect to the monomeric α-cyanoacrylate binders. Thus, one may use inorganic fillers such as fused silica, quartz, aluminum oxide, and the like, or organic fillers such as finely divided polyethylene or other organic polymer which is insoluble in monomeric esters of α-cyanoacrylic acid and inert thereto. The particle size of the finely divided filler should preferably be such that a relatively smooth paste results when the filler is blended with the monomeric α-cyanoacrylate binder, it generally being preferred that the particles be fine enough to pass through a No. 325 sieve of the U.S. Standard Sieve Series.

The binder for the adhesive cement composition may be any of the adhesive monomeric esters of α-cyanoacrylic acid described in the aforementioned U.S. Pat. No. 2,794,788. These monomeric cyanoacrylic esters are the monomeric esters of α-cyanoacrylic acid having the general formula:

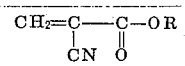

wherein R is an alkyl group of two to 16 carbon atoms, a cyclohexyl group or a phenyl group. The monomeric ester methyl-α-cyanoacrylate, although included among those described in U.S. Pat. No. 2,794,788, is generally unsatisfactory for the reasons given, for use in the cements of the present invention. The preferred monomeric cyanoacrylic esters are the alkyl esters of α-cyanoacrylic acid, with the alkyl group containing from about two to 10 carbons, as it has been observed that as the size of the alkyl group increases the hardness of the resulting cement tends to decrease. Where the adhesive cement is to be used, for example, for sealing or caulking under conditions where hardness is not of any particular importance and may even be undesirable the higher alkyl monomeric esters may be completely satisfactory.

As the activator for treating the finely divided filler, any of the basic amine compounds may be used having a $pK_b$ in water of 1 to 12 and in which no nitrogen has more than one attached group exceeding five carbons. Furthermore, the amine must not have more than one substituent group as bulky as a hexyl or phenyl group. Amines containing two bulky substituents attached to a nitrogen are only slightly active while those with three bulky groups are inactive. Illustrative of such amines are N,N-dimethyl-p-toluidine and N,N-dimethylaniline, N,N-diethylaniline, N-methylbenzylamine, triethanolamine, diethanolamine, 2-picoline, 4-picoline, tributylamine, 4-ethylpyridine, pyridine, N,N-diethyl-1-napthylamine, hexamethylenediamine, N,N-diethylethylenediamine.

The $pK_b$ value is determined in accordance with N.F. Hall and M.R. Sprinkle, American Chemical Society, 54 3469(1932). For the amine activator the preferred amines are N,N-dimethyl-p-toluidine and N,N-dimethylaniline. These amines when used in the system described show essentially no physical change in the mixture of pretreated filler and monomeric α-cyanoacrylate binder solution until setting time is achieved at which point rapid polymerization and hardening occurs. Thus, if the setting time is five minutes the mixture of pretreated finely divided filler and monomeric α-cyanoacrylate maintain essentially the same viscosity through the period from immediately after mixing up until a fraction of a minute prior to setting. Then rapid setting occurs with the mixture going from a fluid, relatively thin paste, to a hard, tightly adherent solid mass in less than a minute. This has substantial advantages in the use of adhesive cements in that up until the setting time the same can be easily spread onto surfaces to which the cement is intended to bond. However, when the setting time has been reached, rapid bonding occurs thus avoiding long periods of carefully maintaining surfaces in contact until the adhesive is cured sufficiently to remove support.

As previously indicated, with fillers of quartz, alumina, and the like, it is necessary to pretreat the filler with a non-catalytic trialkoxysilyl compound having the terminal group:

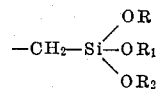

where any of R, $R_1$, and $R_2$ are —$CH_3$ or —$CH_2CH_3$. Illustrative samples of such non-catalytic trialkoxysilyl compounds are:
gamma-methacryloxypropyltrimethoxysilane,
gamma-glycidoxypropyltrimethoxysilane,
triphenylsilane, methyltrimethoxysilane. The preferred non-catalytic trialkoxysilyl compounds are:

gamma-glycidoxypropyltrimethoxysilane and gamma-methacryloxypropyltrimethoxysilane.

Where pretreatment with the non-catalytic trialkoxysilyl compound is required prior to treatment with the amine activator, the pigment is first treated with a solution of the trialkoxysilyl in a solvent. Any solvent nonreactive with respect to the silyl compound and which can readily be removed by evaporation may be employed. The preferred solvents are organic compounds such as the common solvent lower boiling ketones, and aliphatic and aromatic hydrocarbons. The same being preferred because of their ease of removal from the treated pigment and their ready wetting of the same.

The treating solution should contain at least about 5 percent of the silyl compound. When concentrations much below this are used consistency of results is affected particularly over long periods of storage of the treated pigment prior to preparation of the cement. Preferably, amounts of at least 10 percent concentration of the treating solution are employed. Higher concentrations appear to have no deleterious effect as far as stability of the treated filler is concerned and its effect on consistency of curing time obtained. However, too large quantities of the silyl compound do have some effect on viscosity making it difficult to properly mix the filler in the solution. It is, accordingly, generally preferred not to use more than about 60 percent by weight concentration of silyl compound in the treating solution.

After treatment with the solution of silyl compound the pigment is dried by any conventional means. The drying temperature does not appear to be critical with respect to consistency of results. After drying the pigment is then treated with a solution of the amine activator. Any inert, readily removable solvent may be used, preferred solvents for example being those previously mentioned with respect to treatment with the silyl compound. Solutions having a concentration of 0.01 to 1.0 percent by weight amine activator are generally employed. The amine activator solution is added in small amounts while stirring to assure a uniform coating. The amount of amine activator solution added depends on the particular polymerization time required. After treatment with the amine activator the inorganic filler so prepared is found to be stable, and a consistent setting time is obtained when using fillers so treated even after long periods of storage of the treated filler prior to use.

Where quartz and alumina fillers, for example, are not given the silyl pretreatment, as previously indicated, the effectiveness of the amine activator is dissipated on storage with the result that highly erratic setting times are obtained with the amine activator being essentially ineffective after extended periods of storage, such as several days. This apparent interaction between the amine activator and the finely divided filler, however, does not occur with all filling materials. Thus, when finely divided polyethylene is used as the filler it is not necessary to give the finely divided polyethylene the pretreatment with the trialkoxysilyl compounds as the amine treated polyethylene maintains its activity even after extended periods of storage. Thus, when preparing fillers such as polyethylene or other inert materials with respect to the amine activator, the silyl treating step may be omitted.

The treatment of the quartz and alumina fillers with the trialkoxysilyl compounds also has the effect of apparently making the same much more readily wetted with the monomeric alpha cyanoacrylate binder. When quartz and alumina fillers have not been so treated the same give a somewhat gritty paste when blended with the monomeric cyanoacrylate ginder in preparing the cement. The feel and consistency is substantially different from that obtained using fillers that have had the trialkoxysilyl treatment. Also, the cement mixes, because of their improved consistency, are more readily applied to surfaces it is intended to bond. A still further advantage of this pretreatment is that appreciably larger amounts of filler can be incorporated in the cement, i.e., a higher ratio of filler to binder be used. As this tends to increase strength, while reducing cost, any such increase in filler content may be beneficial.

As previously indicated, the ratio of finely divided filler to monomeric $\alpha$-cyanoacrylate binder should be in the order of about one part by weight monomeric $\alpha$-cyanoacrylate binder to one to four parts by weight filler depending on the particular use to be made of the adhesive cement. As the filler content is increased the paste formed by the filler and monomeric cyanoacrylate increases in viscosity and with filler contents much in excess of about four parts filler to one part monomeric $\alpha$-cyanoacrylate, the compositions obtained may be too viscous to handle easily. However, it has also been observed that with monomeric $\alpha$-cyanoacrylate to filler ratios of below one part binder to two parts filler the adhesion and strength of the cement are reduced with further reduction of filler content. As a result, filler contents of much below 1:1 ratio of binder to filler are generally unsatisfactory with respect to utilizing the advantages of substantially increased strength and adherence shown by the cements of the present invention over the use of the binder alone.

Where the adhesive cement is to be used in dental application in some instances it may be desirable to tint the same. This may be done by adding the pigment for tinting to the filler. For some uses a light, slightly gray tine may be desired rather than the white cements that result when using fillers such as quartz or alumina. The slightly gray tint may be obtained by including a small amount of finely divided carbon to the treated filler. However, it is found that if relatively large amounts of carbon are added it tends to interfere with the activation of the binder and again introduce the problem of poor control of the curing time of the binder-filler mix. It has been found that tinting substances such as carbon should, accordingly, not be added in amounts of more than about 0.15 percent by weight, the weight percent not exceeding 0.1 where activated carbon is used.

The adhesive-filling cements of the present invention have many uses besides that of treating teeth such, for example, as the sealing of cracks and fissures in metal pipes, ceramics and the like the same being useful where most other filling cement materials are unsatisfactory either because of their poor adhesion to other surfaces or their poor resistance to deterioration under moist conditions. Not only can the adhesive cement composition of the present invention be used where moist surfaces are encountered, but the same can actually be applied to surfaces underwater and the surfaces then bonded together while still underwater on polymerization. The adhesive cements have reasonably good compressive strengths of up to 6,000 pounds per square inch, for example, having been obtained with cements utilizing a 1 to 3 weight ratio of isobutyl cyanoacrylate to finely divided (passing through 325 mesh screen) fused alumina filler. Also, the shrinkage factor on hardening is found to be quite low.

The following examples, which are given for the purpose of illustration only, will help to further illustrate the practice of the invention in making specific adhesive cement compositions and illustrate some of the uses to which they may be applied.

\* When 0.2 g. of this treated alumina or quartz is mixed with 0.1 g. isobutyl γ-cyanoacrylate (IBC) as in Example I-A, the pastes do not solidify or become more viscous after one hour. These pastes are much less gritty than the corresponding pastes prepared with untreated quartz or alumina. \* Similarly, mixtures of 0.3 g. of treated alumina or 0.4 g. of treated quartz mixed with 0.1 g. IBC do not solidify or beocme more viscous after one hour. When 0.3 g. untreated alumina or 0.4 untreated quartz is mixed with 0.1 g. IBC, pastes are

| Filler | Appearance of Mix | Time Elapsed Between Filler Preparation and Blending with Binder | Setting Time |
| --- | --- | --- | --- |
| Alumina | Fluid paste of gritty consistency | — | No change in viscosity after 1 hour standing |
| Alumina & silane | Fluid nongritty paste | — | do. |
| Alumina + DMT Activator | Fluid paste of gritty consistency | 10 minutes | 6 minutes |
| do. | do. | 24 hours | No change in viscosity after 1 hour standing |
| Alumina + silane & DMT Activator | Fluid nongritty paste | 10 minutes | 5½ minutes |
| do. | do. | 1 month | 5½ minutes |
| Quartz | Fluid paste of gritty consistency | — | No change in viscosity after 1 hour standing |
| Quartz + silane | Fluid nongritty paste | — | do. |
| Quartz + DMT Activator | Fluid paste of gritty consistency | 10 minutes | 4½ minutes |
| do. | do. | 24 hours | 7½ minutes |
| Quartz + DMT Activator | Fluid paste of gritty consistency | 96 hours | No change in viscosity after 1 hour standing |
| Quartz + silane + DMT Activator | Fluid nongritty paste | 10 minutes | 5½ minutes |
| do. | do. | 1 month | 5½ minutes |
| Polyethylene | Fluid paste | — | No change in viscosity after 1 hour standing |
| Polyethylene + DMT | do. | 10 minutes | 7 minutes |
| do. | do. | 1 month | 7 minutes |

EXAMPLE I

Isobutyl α-cyanoacrylate (containing 300 ppm. $SO_2$ and 0.1 percent hydroquinone as stabilizers) is admixed with finely divided filler (prepared in the manner hereinafter described in the sections of the present example as set off by \*'s) in amounts of 0.2 grams filler and 0.1 gram isobutyl α-cyanoacrylate. The setting time and appearance of the resulting mixes is set forth, for purpose of comparison, in the following table.

\* A. Alumina (0.2 g., fused, white, 325 grit) is mixed with isobutyl α-cyanoacrylate (0.1 g., containing 300 ppm. $SO_2$ and 0.1 percent hydroquinone as stabilizers). This paste does not solidify or become more viscous after standing for 1 hour. When 0.2 g. quartz (opaque, fused silica sand, ground to 20–25 micron particle size) or 0.1 g. powdered polyethylene is substituted for alumina, the same result is obtained. \*

\* B. To 5 grams alumina (specifications as in Example I-A) is added 20 cc. of a 20 percent by volume γ-methacryloxy-propyltrimethoxysilane—acetone solution. The mixture is allowed to stand for 30 minutes with occasional stirring. The mixture is filtered in a Buchner Funnel and air was pulled through the filter for 1 hour to dry the alumina. The above procedure is repeated with 5 grams of quartz (specifications as in Example I-A) except that only 10 cc. of 20 percent by volume γ-methacryloxypropylmethoxysilane is used.\* not formed and the filler continues to be separate particles.

\*C. To 10 g. alumina (specifications as in Example I-A) is added 180 drops (weight of one drop = 0.0064 g.) of a 1 percent by weight N,N-dimethyl-p-toluidine (DMT) -acetone solution (0.1 g. DMT). The alumina is allowed to dry in air for 10 minutes. To 0.2 g. of this treated alumina is added 0.1 g. IBC (containing 300 ppm. $SO_2$, 0.1 percent hydroquinone). The paste solidified in 6 minutes. The remaining treated alumina is sealed in a glass vial. After 24 hours storage, 0.2 g. alumina is mixed with 0.1 g. IBC. The mixture does not solidify or become more viscous after 1 hour. \*

\*The above procedure is repeated except quartz (specifications as in Example I-A) is substituted for alumina and only 0.03 g. DMT in 0.3 cc. acetone is added. The quartz-IBC mixture solidifies after 4 ½ minutes. The remaining treated quartz is sealed in a vial. After 24 hours, a 0.2 g. quartz and 0.1 g. IBC mixture solidifies in 7 ½ minutes. After 96 hours storage, a 0.2 g. quartz and 0.1 g. IBC mixture does not solidify or become more viscous 1 hour after mixing.\*

\*D. To 10 g. of alumina treated with γ-methacryloxypropyltrimethoxysilane as in Example I-B is added dropwise with stirring 25 drops of a 1 percent by weight N,N-dimethyl-p-toluidine (DMT) - acetone solution (weight of one drop = 0.0064 g. weight DMT added = 0.0016 g.). The mixture is blended well and allowed to dry in air for 10 minutes. To 0.2 g. of this treated alumina is added 0.1 g. IBC. The smooth paste solidified in 3 ½ minutes. There is no noticeable increase in viscosity until about 15 seconds before the mixture solidified to a hard mass. Four grams of alumina, treated with methacryloxypropyltrimethoxysilane, is blended with the remaining 9.8 g. of treated alumina. To 0.2 1 g. of this alumina is added 0.1 g. IBC. The mixture solidifes in 6 ½ minutes. *Five drops of DMT - acetone solution (0.00032 g. DMT) is added to the remaining 13.6 g. of alumina. The alumina is allowed to dry in air for 10 minutes. To 0.2 g. of this alumina is added 0.1 g. IBC. The paste becomes noticeably more viscous after 5 ¼ minutes and solidifies to a hard smooth mass after 5 ½ minutes. Total DMT = 0.00014 g./g. alumina. The treated alumina is sealed in a vial. Alumina samples (0.2g.) are withdrawn at intervals over a one month period and mixed ith 0.1 g. IBC. All of the mixtures solidify 5 ½ minutes after addition of IBC.*

* To 20 g. alumina, treated with γ-methacryloxypropyltrimethoxysilane as in Example I-B, is added with stirring 20 drops of a 1 percent by weight DMT - acetone solution (0.00128 g. DMT). A 0.3 g. alumina and 0.1 IBC mixture solidified in 6 ½ minutes. Five drops of DMT - acetone solution (0.00032 g. DMT) is added to the remaining 19.7 g. of alumina. The alumina is allowed to dry in air for 5 minutes. A 0.3 g. of alumina and 0.1 g. IBC mixture becomes noticeably more viscous after 5 minutes and solidifies to a hard smooth mass after 5 ½ minutes. Total DMT = 0.00008g./g. alumina. The treated alumina is sealed in a vial. Alumina samples (0.3 g.) are withdrawn at intervals over a one month period and mixed with 0.1 g. IBC. All of the mixtures solidify 5 ½ minutes after addition of IBC.*

To 20 g. of quartz (treated with γ-methacryloxypropyl-trimethoxysilane (as in Example I-B) is added, 60 drops of a 1 percent by weight DMT - acetone solution (0.0038 g. DMT). The quartz is allowed to dry for 10 minutes in air. 0.4 g. of this quartz is mixed with 0.1 g. IBC. The viscosity of the mixture does not change noticeably during the first 5 minutes. During the next 30 seconds, the mixture becomes more viscous and solidifies to a hard smooth mass. Total DMT = 0.00019 g./g. quartz. The treated quartz is sealed in a vial. Quartz samples (0.4 g.) are withdrawn at intervals over a one month period and mixed with 0.1 g. IBC. All of the mixtures solidify 5 ½ minutes after addition of IBC.

To 10 g. quartz (treated γ-methacryloxypropyltrimethoxysilane as in Example I-B) is added 60 drops of a 1 percent by weight DMT - acetone solution (0.0038 g. DMT). The quartz is allowed to dry for 10 minutes in air. 0.2 g. of this quartz is mixed with 0.1 g. IBC. The mixture solidifies after 6 ½ minutes. Five drops of DMT - acetone solution (0.0003 g. DMT) are added to the remaining 9.8 g. of quartz. When 0.2 g. of the quartz is mixed with 0.1 g. IBC, the mixture solidifies in 5 minutes. One gram of quartz (treated with γ-methacryloxypropyltrimethoxysilane) is aded to the remaining 9.6 g. quartz. When 0.2 g. of treated quartz is mixed with 0.1 g. IBC, the mixture solidifies in 5 ½ minutes. Total DMT = 0.00037 g. DMT/g. quartz. There is no noticeable increase in viscosity for the first 5 ¼ minutes after addition of IBC. The treated quartz is sealed in a vial. Quartz samples (.0.2 g.) are withdrawn at intervals over a 1 month period and mixed with 0.1 g. IBC. All of the mixtures solidify 5 ½ minutes after addition of IBC.

To 10 g. polyethylene (powdered lubricant type) is added dropwise with stirring 20 drops of a 1 percent by weight DMT - acetone solution (0.0013 g. DMT). The polyethylene is allowed to dry in air for 10 minutes. 0.2 g. of this polyethylene mixed with 0.1 g. IBC solidifies in 31 minutes. *40 drops of DMT - acetone (0.0026 g. DMT) are added to the remaining 9.8 g. of polyethylene. The polyethylene is allowed to dry for 10 minutes in air. A mixture of 0.2 g. of this polyethylene and 0.1 g. IBC solidifies in 7 minutes. TOTAL DMT = 0.0039 g. DMT/g. polyethylene. Polyethylene treated in the manner above is sealed in a vial. Samples are withdrawn over a 1 month period and mixed with 0.1 g. IBC. All of the mixtures solidified 7 minutes after the addition of the IBC. 50 drops DMT - acetone are added to the remaining 9.6 g. of polyethylene. The polyethylene is allowed to dry for 10 minutes in air. To 0.1 g. of this polyethylene is added 0.1 g. IBC. There is no noticeable increase in viscosity during the next 4 minutes. During the next 30 seconds the viscosity increases and the mixture soidifies. Total DMT = 0.00071 g. DMT/g. polyethylene. The solid is softer than that obtained with the quartz or alumina filled mixtures. The treated polyethylene is sealed in a vial. Samples are withdrawn over a 1 month period and mixed with 0.1 g. IBC. All of the mixtures solidify 4 ½ minutes after the addition of IBC.*

EXAMPLE II

A ⅛ inch diameter hole is drilled in a ½ inch diameter copper tube (1/16 inch wall thickness) fitted at one end with threads for attachment to a waterline and at the other end with a plug. Water is passed through the tube. The water is then drained from the tube and while the tube is still wet a cement paste is prepared by mixing 0.6 g. alumina (treated with γ-methacryloxypropyl-trimethoxysilane and DMT, Example I-D) with 0.2 g. IBC. The smooth paste is applied to the damp surface of the hole in the pipe. The paste solidifies in 5 ½ minutes to form a hard smooth water-impermeable seal. The tube, which is sealed at the end, is filled with water and attached to a 45 psi. water line. The water is turned on and the tube under the 45 psi. left for an extended period of time. No sign of leakage is observed after 6 weeks of continued pressure.

EXAMPLE III

The posterior teeth in two patients were treated for sealing pits and fissures. These included permanent maxillary and mandibular first and second premolars and molars. Pits and fissures were clearly visible in all teeth. The teeth were prepared by cleaning and drying and then treating for 45 seconds with a 50 percent phosphoric acid solution in which was dissolved 7 percent by weight of zinc oxide. The mouth was then rinsed and the teeth isolated and dried.

Utilizing the treated alumina and the cyanoacrylate of Example I-D, eight teeth were treated with a cement mix utilizing a 2 to 2 ratio of filler to cyanoacrylate and eight teeth were treated utilizing a ratio of three parts filler to one part cyanoacrylate.

Both mixes were quite fluid and were applied in a thin coat over the areas showing the pits and fissures. The cement mix showed essentially no change in viscosity during application which took between 2 and 3 minutes. About 4 minutes after coating 7 minutes after bending) the teeth were rinsed and the cement was found to have cured into a tightly adhering protective coating. After 3 weeks the teeth were examined. The examination revealed that all protective coatings remained intact.

Temporary fillings were placed in broken down carious teeth of a patient, the filling being formed of the cement composition used in sealing the pits and fissures. The teeth filled were permanent maxillary and mandibular anteriors and posterior. There was no preparation of the teeth other than rinsing and then isolating and drying. Cement mixes of both the 2 to 1 and 3 to 1 ratios were used as in the treatment of the pits and fissures. About 5 ½ minutes after mixing the cement in each instance set into a hard dental restoration which was securely anchored to the underlying tooth. The patient was examined after 3 weeks and the examination revealed that all the cement dental restorations so applied remained intact.

In order to determine the compressive strength of the dental restorative material molded cylinders of the cements, both in the 2 to 1 ratio and 3 to 1 ratio were made. These cylinders were then immersed in water at 37°C. for 24 hours and then removed and compression tests were made in the axial direction of the cylinder using an Instron instrument with jaw speed of 0.02 inch per minute. The strength obtained is 5,300 p.s.i. for the cement having a 2 to 1 ratio of filler to binder and 5,700 p.s.i. for those cements having a 3 to 1 ratio.

EXAMPLE IV

Approximately 0.1 g. of pretreated alumina - isobutyl $\gamma$-cyanoacrylate mixture (3:1 by weight) prepared as in Example I-D is spread in a ½-inch square on the end of a steel plate ½ inch × 4 inch × 1/16 inch. A second steel plate is placed on top of the first plate with a ½ inch overlap. This plate is supported by a third plate so that even contact is made in the joint. The plates are pressed lightly together to make good contact. The bond solidifies in 5 ½ minutes. Five minutes later the bond is tested by applying pressure to the ends of the plates. The plates bend to a 20° angle before the plates separate. Rupture occurs within the polymeric mixture, with the material still adhering to both plates. The above procedure is repeated using IBC and IBC thickened (by dissolving methyl methacrylate polymer in the ICB) to a viscosity similar to that of the alumina filled mixture. A small amount of N,N-dimethyl-p-toluidine is added as an initiator. These bonds are less than one-quarter as strong as that of the alumina filled IBC. The plates are not bent during bond rupture. Also the bond is found to break at the polymer-metal interface leaving a clean metal surface.

Bonds formed with a pretreated alumina — IBC mixture (2:1 by weight) are appreciably weaker than those formed with a 3:1 mixture. Rupture, however, still occured within the cement material rather than at the interface between the cement and metal. Bonds made with pretreated quartz — IBC mixtures (4:1 and 2:1 by weight), prepared as in Example I-D, are weaker than those formed with the pretreated alumina filled mixtures with only slight bending of the plates before rupture. However, the bonds are still at least twice as strong as those formed by IBC alone or by IBC that has been thickened to an equal viscosity by dissolving therein methyl methacrylate polymer. Rupture occurs within the cured cement with material adhering to both plates.

Bonds formed with polyethylene — IBC mixtures (2:1 and 1:1 by weight), prepared as in Example I-C, are still weaker than those formed by the quartz filled mixtures. Rupture still occurs in the cement material, however, and the bonds are appreciably stronger than those formed with IBC alone or thickened with methyl methacrylate.

The above procedures are repeated with the steel plates immersed in water. The cements immediately after mixing are coated with a spatula on steel plates while the plates are submerged under water. The bonds solidify in about 2 ½ to 3 minutes. The bond strengths are the same as for those formed out of water.

Steel plates are bonded more strongly to glass by all of the filled mixtures than by unfilled IBC. Rubber is bonded strongly to glass with rupture occurring mainly in the rubber.

EXAMPLE V

Twenty grams of alumina is treated with 20 cc. of a 20 percent by weight $\gamma$-glycidoxypropyltrimethoxysilane using the procedure in Example I-B. To 10 g. of this treated alumina is added 20 drops of a 1 percent by weight N,N-dimethylaniline - acetone solution (0.0013 g. dimethylaniline). To 0.3 g. of this alumina is added, with mixing, 0.1 g. of isobutyl $\alpha$-cyanoacrylate (300 ppm $SO_2$ and 0.1 percent hydroquinone stabilizers). The smooth paste resulting has the same viscosity as that prepared from alumina treated with $\gamma$ - methacryloxypropyl-trimethoxysilane. The paste becomes noticeably more viscous 2 ½ minutes after IBC is added and solidifies to a hard mass in 3 minutes. Total dimethylaniline = 0.00013 g./g. alumina. To 0.2 g. of the above treated alumina 0.1 g. of IBC is added. The smooth paste becomes noticeably more viscous in 5 ¼ minutes and solidifies in 5 ½ minutes after IBC addition. The treated alumina is stored in a sealed glass vial for three weeks. After such storage a mix of 0.2 g. treated alumina to 0.1 g. IBC solidifies in 5 ½ minutes after addition of IBC.

To 0.3 g. of alumina (treated with $\gamma$ - glycidoxypropyl-trimethoxysilane but not with N,N-dimethylaniline) is added 0.1 g. IBC. The paste does not solidify or become more viscous after 1 hour.

EXAMPLE VI

To 0.4 g. quartz (treated $\gamma$-methacryloxypropyl-trimethoxysilane and N,N-dimethyl-p-toluidine see Example I-D, set time with isobutyl $\alpha$-cyanoacrylate = 5 ½ minutes), was added 0.1 g. n-octyl $\alpha$-cyanoacrylate (291 ppm $SO_2$, 0.1 percent hydroquinone as stabilizers). The mixture solidifies after 17 minutes.

To 10 g. alumina (treated $\gamma$ - methacryloxypropyl-trimethoxysilane as in Example I-B) is added with stirring 40 drops of a 1 percent by weight DMT - acetone solution (0.0026 g. DMT). The alumina is allowed to dry in air for 10 minutes. To 0.3 g. of the alumina is added 0.1 g. n-octyl $\alpha$-cyanoacrylate. The mixture becomes noticeably more viscous after 4 ½ minutes and solidifies to a hard mass 5 minutes after addition of n-octyl $\alpha$-cyanoacrylate. Total DMT = 0.00026 g./g. alumina. The solid is not as hard as those prepared with IBC. Steel plates are bonded together as in Example IV. The bonds are not as strong as those prepared with the pretreated quartz — IBC mixtures. Bond rupture still occurs within the cement.

EXAMPLE VII

Cements are prepared using as the binder methyl-α-cyanoacrylate. The time required for solidification of methyl-α-cyanoacrylate mixtures with untreated quartz or alumina is very dependent on the relative humidity to which they are exposed. If 0.2 g. alumina (specifications as in Example I-A) is mixed with 0.1 g. methyl-α-cyanoacrylate (containing 180 ppm $SO_2$ stabilizer), the mixture does not solidify in 30 minutes if the relative humidity is less than 2 percent. However, this mixture solidifies in 5 minutes if the relative humidity is 12 percent, and in 3 minutes if the relative humidity is 25 percent. If 0.4 g. pretreated quartz (treated with γ - methacryloxypropyltrimethoxysilane and N,N-dimethyl-p-toluidine as in Example I-D; set time with isobutyl α-cyanoacrylate = 5 ½ minutes) is mixed with 0.1 g. methyl α-cyanoacrylate, the mixture solidified in 10 seconds with a relative humidity of 2 percent.

Particular embodiments of the invention have been used to illustrate the same. The invention, however, is not limited to these specific embodiments. In view of the foregoing disclosure, variations and modifications thereof will be apparent. It is intended to include within the invention all such variations and modifications except as do not come within the scope of the appended claims.

Having thus described our invention, we claim:

1. A filler useful in the preparation of cements utilizing cyanoacrylate binders comprising material of the group consisting of quartz and alumina in particulate form the particles of filler containing an undercoat of at least one non-catalytic trialkoxysilyl compound of the group consisting of gamma-glycidoxypropyltrimethoxysilane and gamma-methacryloxy-propyltrimethoxysilane with an overlaying deposit of an effective amount of at least one amine activator of the group consisting of N,N-dimethyl-p-toluidine and N,N-dimethylaniline.

2. A filler useful in the preparation of cements utilizing cyanoacrylate binders comprising a finely divided solid containing deposited thereon an effective amount of at least one basic amine activator of the group consisting of N,N-dimethyl-p-toluidine and N,N-dimethylaniline said amine activator being superimposed on a coating of at least one non-catalytic trialkoxysilyl compound of the group consisting of gamma-glycidoxypropyltrimethoxysilane and gamma-methacryloxypropyltrimethoxysilane.

3. A filler useful in the preparation of cements utilizing cyanoacrylate binders comprising a finely divided inorganic solid containing an undercoat of a compound selected from the group consisting of gamma-glycidoxypropyltrimethoxysilane and gamma-methacryloxypropyltrimethoxysilane, with an overlay deposit of an effective amount of an activator having a $pK_b$ in water of 1 to 12 and no nitrogen having more than one attached group exceeding five carbons.

4. A filler useful in the preparation of cements utilizing cyanoacrylate binders comprising a finely divided solid containing deposited thereon an effective amount of a basic amine activator selected from the group consisting of N,N-dimethyl-p-toluidine and N,N-dimethylaniline.

* * * * *

UNITED STATES PATENT OFFICE
CERTIFICATE OF CORRECTION

Patent No. 3,839,065              Dated  October 1, 1974

Inventor(s)  Wendell C. Overhults et al

It is certified that error appears in the above-identified patent and that said Letters Patent are hereby corrected as shown below:

In Column 1, line 67, "sme" should read --- same ---.

In Column 3, line 25, "acyanoacrylate" should read --- a-cyanoacrylate ---.

In Column 6, line 5, "ginder" should read --- binder ---.

In Column 6, line 40, "tine" should read --- tint ---.

In Example 1, Columns 7 & 8, "Example 1 should be before Table 1.

In Column 7, line 68, "γ-methacryloxypropylmethoxysilane" should read --- γ-methacryloxypropyltrimethoxysilane ---.

In Column 8, line 2, "γ-cyanoacrylate" should read --- α-cyanoacrylate ---

In Column 8, line 8, "beocme" should read --- become ---.

In Column 9, line 6, "To 0.2 1" should read --- To 0.2 ---.

In Column 9, line 17, "mixed ith" should read --- mixed with ---.

In Column 9, line 53, "6 1/2 minutes" should read --- 6 1/4 minutes ---.

In Column 10, line 60, " a 2 to 2 ratio " should read --- a 2 to 1 ratio ---.

In Column 10, line 67, " 7 minutes " should read --- ( 7 minutes ---.

In Column 11, line 46, "ICB)" should read --- IBC) ---.

In Column 14, line 5, Claim 1, "p" should read --- $\underline{p}$ ---.

In Column 14, line 11, Claim 2, "p" should read --- $\underline{p}$ ---.

In Column 14, line 31, Claim 4, "p" should read --- $\underline{p}$ ---.

Signed and sealed this 24th day of June 1975.

(SEAL)
Attest:

RUTH C. MASON
Attesting Officer

C. MARSHALL DANN
Commissioner of Patents
and Trademarks